(12) United States Patent
Kencharla

(10) Patent No.: US 11,589,398 B2
(45) Date of Patent: *Feb. 21, 2023

(54) NOTICE OF ABSENCE SUPPORT FOR COEXISTENCE

(71) Applicant: Cypress Semiconductor Corporation, San Jose, CA (US)

(72) Inventor: Raghavendra Kencharla, Bangalore (IN)

(73) Assignee: Cypress Semiconductor Corporation, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/549,328

(22) Filed: Aug. 23, 2019

(65) Prior Publication Data

US 2020/0084807 A1  Mar. 12, 2020

Related U.S. Application Data

(63) Continuation of application No. 16/139,315, filed on Sep. 24, 2018, now Pat. No. 10,433,346.

(Continued)

(51) Int. Cl.
*H04W 72/08* (2009.01)
*H04W 72/12* (2009.01)
(Continued)

(52) U.S. Cl.
CPC ......... *H04W 74/0891* (2013.01); *H04W 4/80* (2018.02); *H04W 72/0446* (2013.01);
(Continued)

(58) Field of Classification Search
CPC ............. H04W 72/12; H04W 72/1205; H04W 72/1215; H04W 74/0891; H04W 74/0808;
(Continued)

(56) References Cited

U.S. PATENT DOCUMENTS 9,026,162 B2   5/2015   Wagholikar et al.
9,088,906 B2   7/2015   Sella et al.
(Continued)

FOREIGN PATENT DOCUMENTS

EP      2544503 A1    1/2013

OTHER PUBLICATIONS

"ESP32 Datasheet," Espressif Systems, Oct. 8, 2016, pp. 1-43; 43 pages.
(Continued)

*Primary Examiner* — Robert C Scheibel

(57) ABSTRACT

A method includes receiving an absence schedule and storing the absence schedule in a memory. The absence schedule indicates a plurality of absence periods during which a group owner device in a wireless network will be unavailable for receiving transmissions in a frequency band. The method further includes controlling a primary radio transceiver of a wireless device based on the absence schedule, receiving a first request from a secondary radio transceiver of the wireless device to transmit a first wireless message in the frequency band, and granting the first request in response to determining based on the stored absence schedule that a transmission time of the first wireless message is within one of the plurality of absence periods.

20 Claims, 8 Drawing Sheets

Related U.S. Application Data

(60) Provisional application No. 62/690,670, filed on Jun. 27, 2018.

(51) Int. Cl.

| | | |
|---|---|---|
| *H04W 72/04* | (2009.01) | |
| *H04W 72/14* | (2009.01) | |
| *H04W 74/08* | (2009.01) | |
| *H04W 4/80* | (2018.01) | |
| *H04W 72/0453* | (2023.01) | |
| *H04W 72/0446* | (2023.01) | |

(52) U.S. Cl.
CPC ..... *H04W 72/0453* (2013.01); *H04W 72/082* (2013.01); *H04W 72/1205* (2013.01); *H04W 72/1215* (2013.01); *H04W 72/14* (2013.01); *H04W 74/0808* (2013.01)

(58) Field of Classification Search
CPC ............... H04W 4/80; H04W 72/0446; H04W 72/0453; H04W 72/082; H04W 72/14
See application file for complete search history.

(56) References Cited

U.S. PATENT DOCUMENTS

| | | |
|---|---|---|
| 9,148,854 B2 | 9/2015 | Garg et al. |
| 9,167,622 B2 | 10/2015 | Homchaudhuri et al. |
| 9,521,619 B2 | 12/2016 | Balasubramanian et al. |
| 9,681,444 B2 | 6/2017 | Amini et al. |
| 9,769,752 B2 | 9/2017 | Hayes et al. |
| 9,894,708 B2 | 2/2018 | Ko et al. |
| 10,368,064 B2* | 7/2019 | Smadi ................... H04N 19/107 |
| 10,433,346 B1 | 10/2019 | Kencharla |
| 2015/0024687 A1* | 1/2015 | Rawat ............... H04W 72/1215 455/41.2 |
| 2015/0036735 A1* | 2/2015 | Smadi ................... H04L 65/605 375/240.02 |
| 2015/0200692 A1* | 7/2015 | Chiou .................... H04B 1/406 370/297 |
| 2016/0050686 A1* | 2/2016 | Krishnamoorthi .... H04W 28/04 455/418 |
| 2016/0057796 A1 | 2/2016 | Kim et al. |
| 2016/0262169 A1 | 9/2016 | Das et al. |
| 2016/0278035 A1* | 9/2016 | Yae ..................... H04B 1/3822 |

OTHER PUBLICATIONS

International Search Report for International application No. PCT/US2019/034397 dated Jul. 8, 2019, 2 pages.

USPTO Applicant Initiated Interview Summary for U.S. Appl. No. 16/139,315 dated Apr. 29, 2019, 3 pages.

USPTO Non-Final Rejection for U.S. Appl. No. 16/139,315 dated Feb. 1, 2019, 21 pages.

USPTO Notice of Allowance for U.S. Appl. No. 16/139,315 dated May 31, 2019, 8 pages.

Written Opinion of the International Searching Authority for International application No. PCT/US2019/034397 dated Jul. 8, 2019, 9 pages.

* cited by examiner

NOTICE OF ABSENCE SUPPORT FOR COEXISTENCE

RELATED APPLICATIONS

This application is a continuation of U.S. Non-Provisional application Ser. No. 16/139,315, now U.S. Pat. No. 10,433, 346, filed on Sep. 24, 2018, which claims priority to U.S. Provisional Application No. 62/690,670, filed on Jun. 27, 2018, both of which are incorporated by reference herein in their entirety.

TECHNICAL FIELD

This disclosure relates to the field of wireless communications and, in particular, to coexistence techniques for limiting interference between multiple radio transceivers.

BACKGROUND

Wi-Fi is a technology for connecting devices in wireless local area networks according to the Institute of Electrical and Electronics Engineers (IEEE) 802.11 specification. Devices that can that can be connected using Wi-Fi technology include personal computers, video-game consoles, phones, tablets, digital cameras, smart televisions, digital audio players, printers, and more. These and other Wi-Fi compatible devices can access the Internet by connecting to an Internet-connected wireless access point.

One of the frequency bands most commonly used by Wi-Fi devices is the 2.4 gigahertz (GHz) industrial, scientific and medical (ISM) radio band, which is internationally designated for use in industrial, scientific and medical fields for purposes other than telecommunications. In addition, popular communication technologies such as Bluetooth also use the 2.4 GHz band. The increasing number of Bluetooth and other devices that use or emit signals in the 2.4 GHz band can interfere with Wi-Fi signals in the same band, particularly when these technologies are collocated within a single device.

BRIEF DESCRIPTION OF THE DRAWINGS

The present disclosure is illustrated by way of example, and not by way of limitation, in the figures of the accompanying drawings.

DETAILED DESCRIPTION

Figure 1:
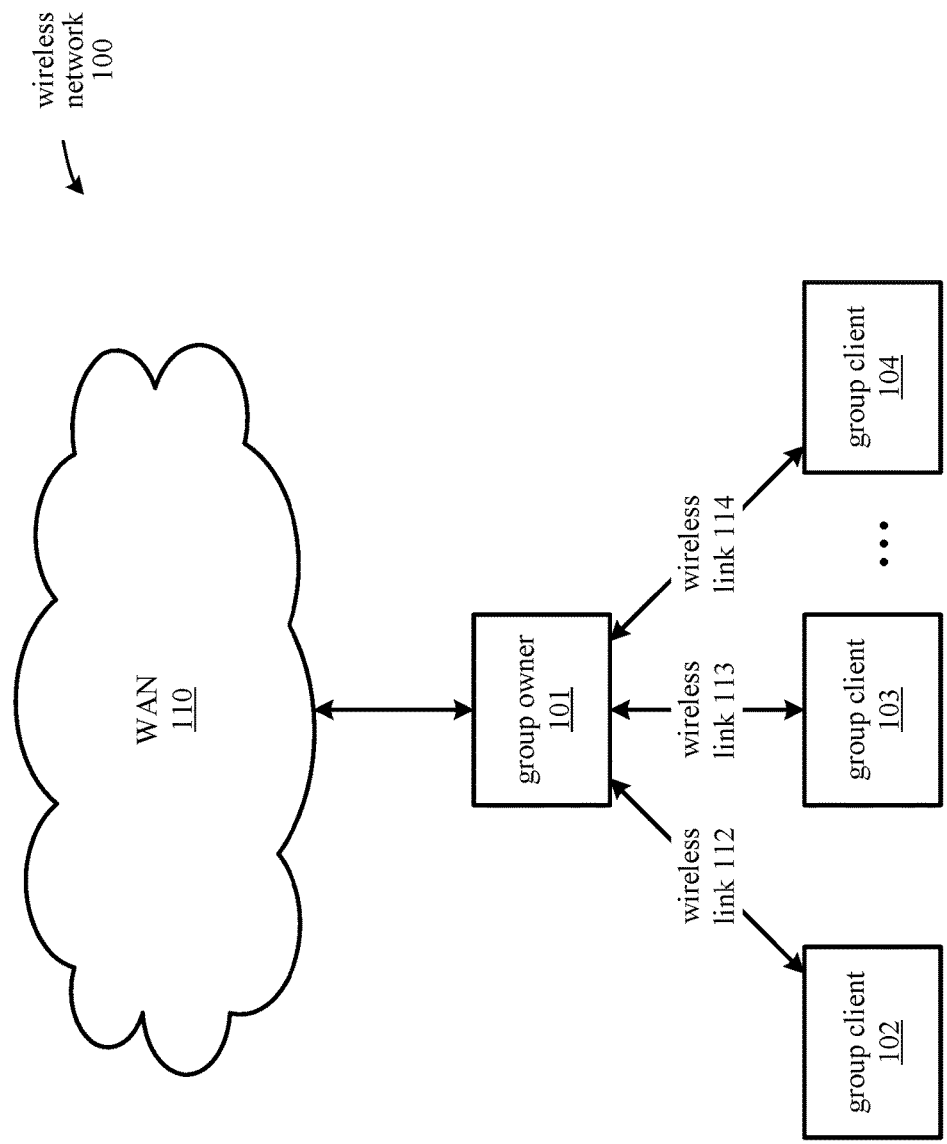
FIG. 1 is a block diagram of a wireless network, according to an embodiment.

The following description sets forth numerous specific details such as examples of specific systems, components, methods, and so forth, in order to provide a good understanding of several embodiments of the claimed subject matter. It will be apparent to one skilled in the art, however, that at least some embodiments may be practiced without these specific details. In other instances, well-known components or methods are not described in detail or are presented in a simple block diagram format in order to avoid unnecessarily obscuring the claimed subject matter. Thus, the specific details set forth are merely exemplary. Particular implementations may vary from these exemplary details and still be contemplated to be within the scope of the claimed subject matter.

Bluetooth and WiFi communication technologies share a common wireless medium in the 2.4 GHz ISM band. When Bluetooth and wireless local area network (WLAN) devices using WiFi are collocated (e.g., in a combination device), acceptable performance for both of the Bluetooth and WiFi radio transceivers is maintained by implementing coexistence techniques to allow these technologies to share the wireless band. These coexistence techniques employ mechanisms for protecting the wireless medium when one of the radio transceivers is transmitting, preventing interference from other collocated radio transceivers. Coexistence mechanisms in a wireless network are implemented in a Packet Traffic Arbiter (PTA) in a wireless device connected to the wireless network.

One method for allowing the sharing of a wireless medium between two or more radio transceivers utilizes clear-to-send (CTS) frames which are transmitted by a wireless device to reserve access to the medium for itself, known as CTS-to-self frames. Wireless devices in the network can also transmit power management frames, which can be transmitted by a wireless device to indicate that it has changed or will be changing its power consumption state, so that communications destined for the wireless device can be deferred or resumed. A drawback of using CTS-to-self and power management frames is that medium time is consumed by the transmission of these frames, thus reducing the bandwidth available for other messaging. Sometimes, the CTS-to-self and power management frames are not transmitted due to the transmission channel being busy or due to interference, which leads to inadequate protection of the medium.

In one embodiment, a coexistence mechanism allows sharing of a medium between multiple radio transceivers by synchronizing transmission activity of one of the radio transceivers with absence periods indicated in an absence schedule (e.g., a Notice of Absence, or NOA) transmitted from a group owner (GO) of a wireless network instead of using CTS-to-self or power management frames for medium sharing.

In one embodiment, a combination wireless device that includes both WiFi and Bluetooth transceivers is connected via the WiFi transceiver to a wireless network established using a WiFi peer-to-peer (P2P) protocol. A GO of the wireless network transmits a NOA schedule in a beacon. The NOA schedule indicates multiple absence periods when the GO will be unavailable (i.e., unresponsive) to WiFi transmissions. During these absence periods, the WiFi transceivers of other devices (i.e., group clients, or GCs) in the wireless network do not transmit because the GO is unavailable. Accordingly, transmissions from the Bluetooth transceiver are synchronized with the indicated absence periods.

This approach can be used in networks such as peer-to-peer (P2P) networks, closed access point and station (AP-STA) networks, etc. According to this approach, the transmission of CTS-to-self and/or power management frames is not needed, thus avoiding the loss of bandwidth that would have been consumed by the CTS-to-self and power management frames. Instead, the absence schedule (e.g., NOA) transmitted from the GO is used to manage sharing of the wireless medium. Since transmission of a NOA uses fewer frames overall compared to the transmission of CTS-to-self and power management frames, bandwidth of the medium is conserved.

FIG. 1 illustrates an embodiment of a wireless network 100 in which an absence schedule is used to manage sharing between multiple wireless transceivers in a device. The wireless network 100 includes a group owner (GO) device 101 that is connected to each of a set of group client (GC) devices 102-104 via wireless links 112-114, respectively. In one embodiment, the wireless links 112-114 are established according to the WiFi protocol. As illustrated in FIG. 1, the GO device 101 is a central hub in the topology of the P2P wireless network 100. Each of the GC devices 102-104 is able to access the wide area network (WAN) 110 (e.g., the Internet) or other larger network through the GO device 101. The GO device 101 relays communications between the WAN 110 and the GC devices 102-104.

The GO device 101 transmits an absence schedule to the GC devices 102-104 in the network 101. In one embodiment, the absence schedule is a Notice of Absence (NOA) that is included in an information element (IE) of a WiFi beacon frame. The absence schedule indicates multiple absence periods during which the GO device 101 will be unavailable for receiving transmissions from the GC devices 102-104 via their respective wireless links 112-114. The GO device 101 is unresponsive to communications transmitted during these absence periods.

Figure 2:
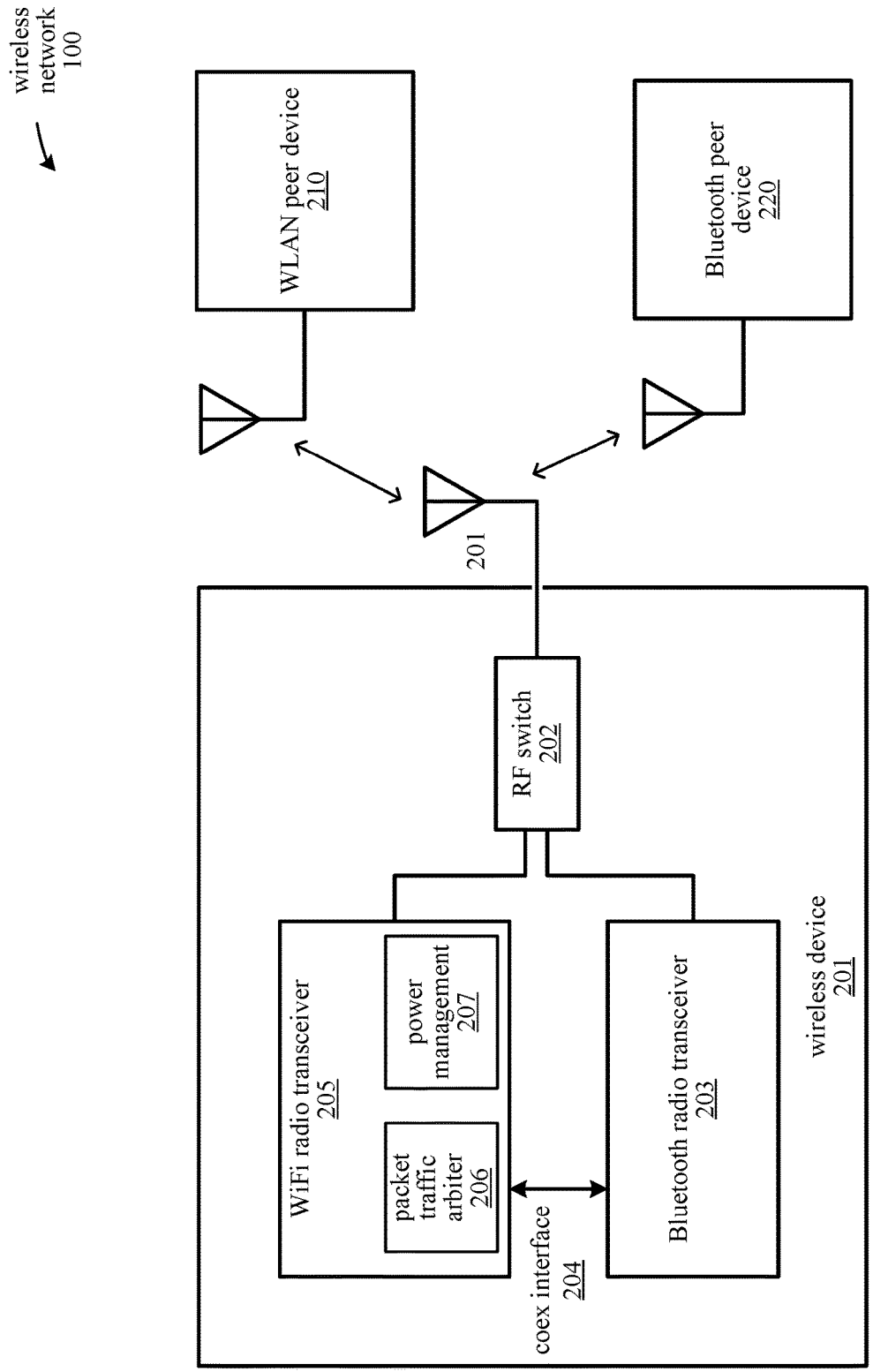
FIG. 2 illustrates a block diagram of a wireless device in a wireless network, according to an embodiment.

FIG. 2 illustrates an embodiment of a wireless device 201 that includes multiple wireless transceivers 203 and 205. The wireless device 201 includes a primary radio transceiver 205 that communicates using the WiFi protocol with other devices in the wireless network (e.g., WLAN peer device 210) and a secondary radio transceiver 203 that communicates using Bluetooth with Bluetooth devices (e.g., Bluetooth peer device 220). In one embodiment, the transceivers 203 and 205 are located in the same device package and on the same integrated circuit chip. In alternative embodiments, the transceivers 203 and 205 are located on different integrated circuit chips in the same device package or in different device packages. A radio frequency (RF) switch 202 selectively connects either of the WiFi transceiver 205 or the Bluetooth transceiver 203 to an antenna 201. When the wireless device 201 is acting as a GO device 101 in a wireless network 100, the WiFi transceiver 205 transmits a NOA in a beacon frame to the other devices in the network 100 according to the WiFi communication protocol.

A power management module 207 in the WiFi transceiver 205 controls the power consumption state of the WiFi transceiver 205. In one embodiment, the NOA is used for reducing power consumption by the WiFi transceiver 205. After transmitting the NOA, the power management module 207 causes the WiFi transceiver to enter a low power consumption state (e.g., a sleep state) during each of the absence periods indicated in the NOA. In the low power consumption state, the radio transmitter and/or other circuitry in the WiFi radio transceiver 205 are turned off to reduce power consumption. Accordingly, communication of the NOA schedule to other devices in the network ensures that these other devices do not attempt to communicate with the wireless device 201 during its scheduled absence periods when the wireless device 201 is in a sleep state or other low power consumption state. In one embodiment, prior to the end of each absence period, the power management module 207 transitions the WiFi transceiver 205 to a higher power consumption state (e.g., an operating or wake state) by turning on the radio transmitter and receiver circuitry and/or other circuitry in the transceiver 205 so that the transceiver 205 is able to transmit and receive communications during the intervals (i.e., presence periods) outside any of the scheduled absence periods.

The secondary radio transceiver 203 communicates wirelessly according to the Bluetooth communication protocol. In order to transmit a message, the Bluetooth transceiver 203 requests access to the medium (i.e., the 2.4 GHz wireless band). In response to a grant of the requested medium access, the Bluetooth transceiver 203 transmits the message according to the Bluetooth protocol to a Bluetooth peer device 220.

The wireless device 201 includes a packet traffic arbiter (PTA) 206 that implements coexistence mechanisms to allow sharing of the medium between the WiFi transceiver 205 and the Bluetooth transceiver 203. In one embodiment, the PTA 206 is implemented by microcode programming of media access control (MAC) layer hardware in the WiFi transceiver 205 and/or implemented in dedicated circuit components. The PTA 206 receives a NOA schedule, then grants medium access to one of the transceivers 203 or 205 based on the absence periods indicated in the NOA schedule. In one embodiment, when the wireless device is a GO device in its wireless network, the NOA schedule is generated by logic in the WiFi transceiver or a host processing unit connected to the wireless device. Alternatively, the NOA schedule can be received via wireless transmission from a WLAN peer device 210. When the wireless device 201 is a GC device, the NOA is transmitted to the wireless device 201 in an IE of a beacon frame. The received NOA schedule is stored in memory accessible to the PTA 206.

When the Bluetooth transceiver 203 has a message to transmit, the transceiver 203 first requests access to the wireless medium. The PTA 206 receives the request from the Bluetooth transceiver 203 via the coexistence interface 204. When the medium access request is received at the PTA 206, the PTA 206 determines whether the request was received during one of the absence periods indicated in the stored NOA schedule. If so, the transmission time of the Bluetooth message will be during the absence period, when WiFi devices in the network will not be transmitting. Accordingly, the PTA 206 grants the request for medium access to the Bluetooth transceiver, since transmission of the Bluetooth message will not interfere with any WiFi communications.

Figure 3:
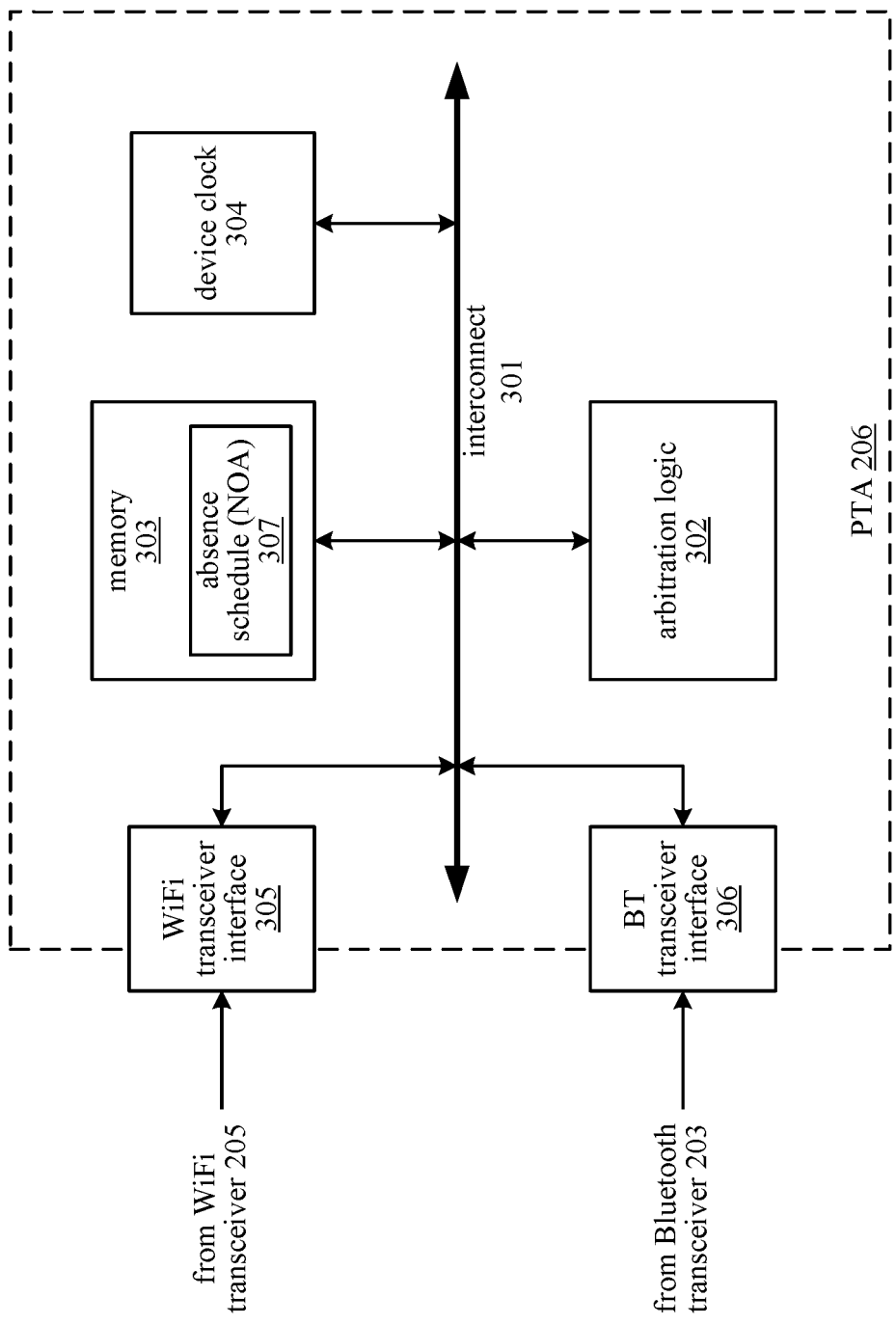
FIG. 3 illustrates a block diagram of a packet traffic arbiter device, according to an embodiment.

FIG. 3 illustrates an embodiment of a PTA 206. In one embodiment, some components of the PTA 206 are shared with other modules in the wireless device 201. For example, the device clock 304 generates a clock signal that can be received and utilized by other components (e.g., the transceivers 203 and 205), and the memory 303 may be accessed via read or write requests from other components in the wireless device 201. In one embodiment, the components of the PTA 206 communicate with each other via an interconnect 301, which can also be shared with other components in the wireless device 201. Referring back to FIG. 2, the PTA 206 is illustrated as being integrated with the WiFi transceiver 205. Accordingly, in one embodiment, the components of the PTA 206 reside in the same device package and integrated circuit chip as the WiFi transceiver 205.

The PTA 206 includes an interface 305 for communicating with the WiFi transceiver 205 and an interface 306 for communicating with the Bluetooth transceiver 203. After the NOA is received by the WiFi transceiver 205, the PTA 206 receives the NOA via the interface 305. The NOA schedule 307 is stored in the memory 303. In one embodiment, the NOA indicates multiple absence periods by specifying a start time of a first absence period after a transmission time or time of receipt of the NOA, a duration of each absence period, the amount of time between consecutive absence periods, and the number of absence periods.

The arbitration logic 302 compares the device clock 304 with the values in the stored NOA schedule 307 to determine whether a given time is within an absence period or a presence period, and grants medium access to one of the transceivers 203 or 205 based on the absence schedule, thus controlling the transmission times of communications transmitted by the transceivers 203 and 205. In particular, the arbitration logic 302 controls the WiFi radio transceiver 205 by causing wireless transmissions from the WiFi radio transceiver 205 to be transmitted during intervals outside the absence periods indicated by the NOA schedule 307.

The arbitration logic 302 also controls the transmission times of wireless messages transmitted by the Bluetooth transceiver 203. When the Bluetooth transceiver 203 has a message to transmit, the transceiver 203 requests access to the medium (i.e., the 2.4 GHz wireless band). The Bluetooth transceiver interface 306 receives the medium access request signal from the Bluetooth transceiver 203, and transmits the signal to the arbitration logic 302. The arbitration logic 302 grants the medium access request in response to determining based on the stored NOA schedule 307 that the current time (as indicated by the device clock 304) is within one of the absence periods indicated in the NOA schedule 307. That is, access to the medium is granted to the Bluetooth transceiver 203 during the absence period. Accordingly, the wireless message to be transmitted by the Bluetooth transceiver 203 is transmitted during an absence period of the WiFi GO device, when the Bluetooth transceiver 203 has access to the medium and when no WiFi signals are being transmitted.

Figure 4A:
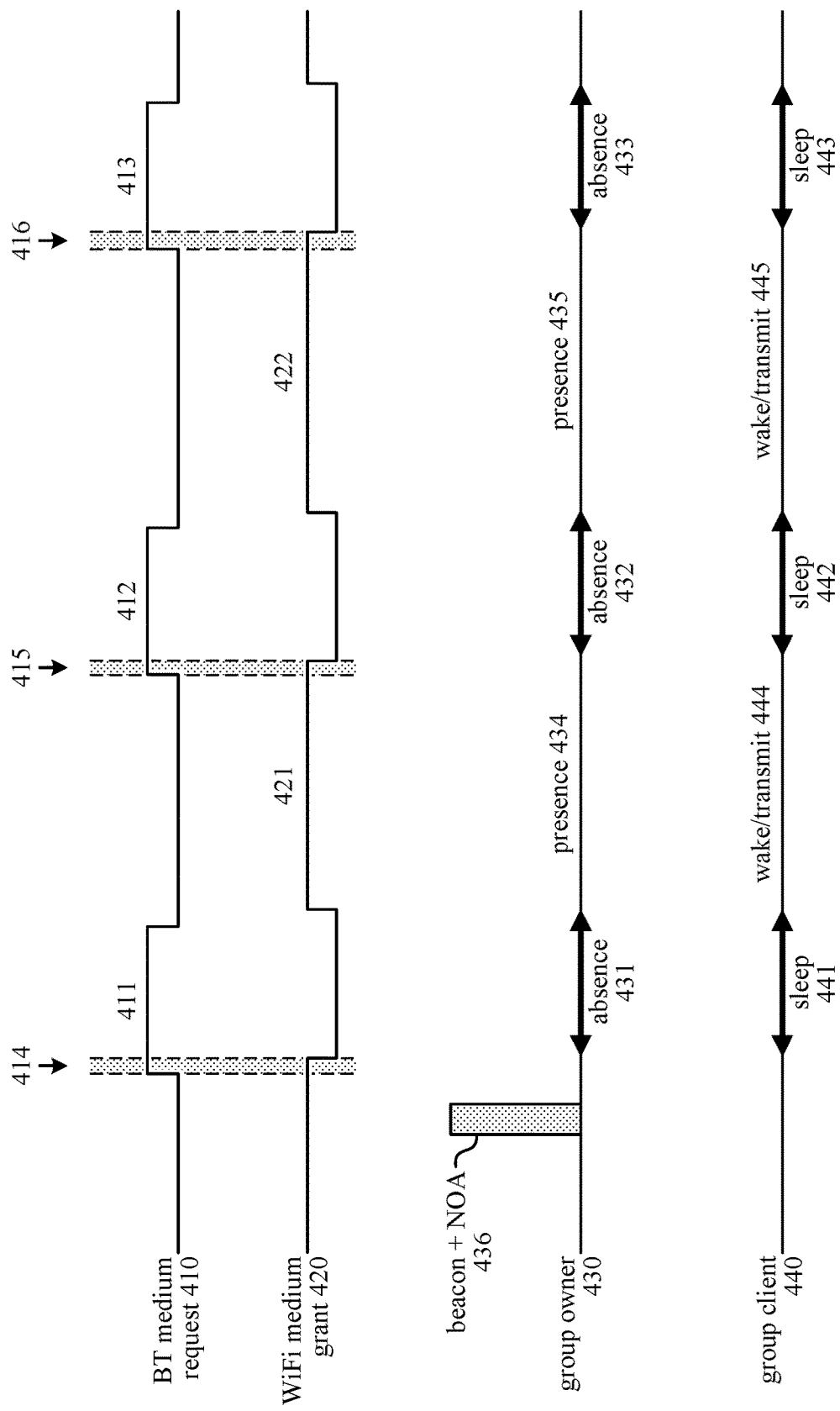
FIGS. 4A and 4B illustrate sequences of events in a coexistence process, according to an embodiment.

FIG. 4A illustrates a sequence of events during operation of the coexistence mechanism, in which transmissions are timed according to an NOA schedule of a GO device. In FIG. 4A, time proceeds from left to right. The Bluetooth medium request signal 410 is asserted high when the Bluetooth transceiver 203 has a message to transmit. The Bluetooth medium request signal 410 can also be asserted to request receiving of Bluetooth signals over the medium. The WiFi medium grant 420 signal is asserted high when the WiFi transceiver 205 is granted access to the wireless medium. The group owner timeline 430 and the group client timeline 440 show events occurring at the GO device (e.g., device 101) and a GC device (e.g., device 102) in the network 100.

As indicated in the group owner timeline 430, the group owner 101 transmits a WiFi beacon frame that includes information about the wireless network 100 sufficient to allow a listening wireless device to connect to the wireless network 100 as a group client. In one embodiment, the beacon frame includes an identifier for the network 100, the network type, current communication parameters and capabilities, encryption type used in the network 100, etc. and is transmitted periodically by the GO device 101. The beacon 436 also includes a NOA schedule, which is included in an IE of the beacon frame.

The NOA indicates multiple absence periods 431-433, during which the GO device 101 will be unavailable to receive WiFi communications from the group clients 102-104 in the network 100. Accordingly, during the absence periods 431-433, the group client 102 enters a low power consumption state (e.g., a sleep state) during periods 441, 442, and 443, corresponding respectively to the absence periods 431, 432, and 433, as shown in the group client timeline 440. In between the absence periods 431-433 are presence periods 434 and 435. Since the GO device 101 is actively receiving and responding to WiFi communications during the presence periods 434 and 435, the group client 102 remains in a higher power consumption state (e.g., a wake state) during periods 444 and 445, corresponding respectively to the presence periods 434 and 435. Transmissions from the group client 102 occur during these periods 444 and 445 since the GO device 101 is available to receive them.

The Bluetooth medium request signal 410 is asserted at the start of period 411. The Bluetooth medium request signal 410 is asserted high when the Bluetooth transceiver 203 has a message to transmit. In one embodiment, if the Bluetooth medium request 410 is asserted prior to an absence period, the PTA 206 waits until an absence period is reached, then grants the Bluetooth medium request 410 in response to reaching the absence period. During the time period 414, the PTA 206 determines whether one of the absence periods indicated in the NOA has been reached. When the current time reaches the absence period 431, medium access is granted to the Bluetooth transceiver by deasserting the WiFi medium grant 420. In one embodiment, the WiFi medium grant 420 is deasserted in response to assertion of the Bluetooth medium request 410 during an absence period. Thus, the WiFi transceiver 205 is no longer allowed to transmit on the medium during the absence period 431, and the Bluetooth transceiver 203 is granted access to the medium.

At the end of period 411, the Bluetooth medium request 410 is deasserted low when the Bluetooth transceiver 203 has no messages to transmit. The WiFi medium grant signal 420 is asserted high in period 421 in response to the end of the absence period 431 and the beginning of presence period 434. As a result, the WiFi medium grant signal 420 is deasserted low at times when the GO device 101 is unavailable and is asserted high when the GO device 101 is available. During period 421, the Bluetooth transceiver 203 is not permitted to access the medium (i.e., does not transmit or receive communications over the medium) while the WiFi transceiver is permitted to access the medium. The above process repeats for each of the absence periods 431-433. For each absence period 431-433, the Bluetooth medium request 410 is asserted in the respective periods 411-413, and in the respective periods 414-416 the PTA 206 grants medium access to the Bluetooth transceiver 203 based on whether an absence period has been reached.

In one embodiment, the Bluetooth transceiver 203 generates periodic traffic with a predictable duty cycle (e.g., enhanced synchronous connection-oriented (eSCO) traffic) that is synchronized with the absence periods 431-433 of the GO device 101. When the Bluetooth transceiver 203 is transmitting eSCO traffic, the beacon 436 is synchronized with the time when the periodic eSCO traffic begins. In one embodiment, Bluetooth eSCO traffic consumes 1250 microseconds of every 7500 microseconds of medium time, leaving 6250 microseconds of every 7500 microseconds of medium time for WiFi transmissions. Since the duty cycle of the eSCO traffic is predictable, a NOA schedule can be devised with accommodates all of the eSCO traffic, in which the absence periods include at least 1250 microseconds of every 7500 microseconds of medium time.

Figure 4B:
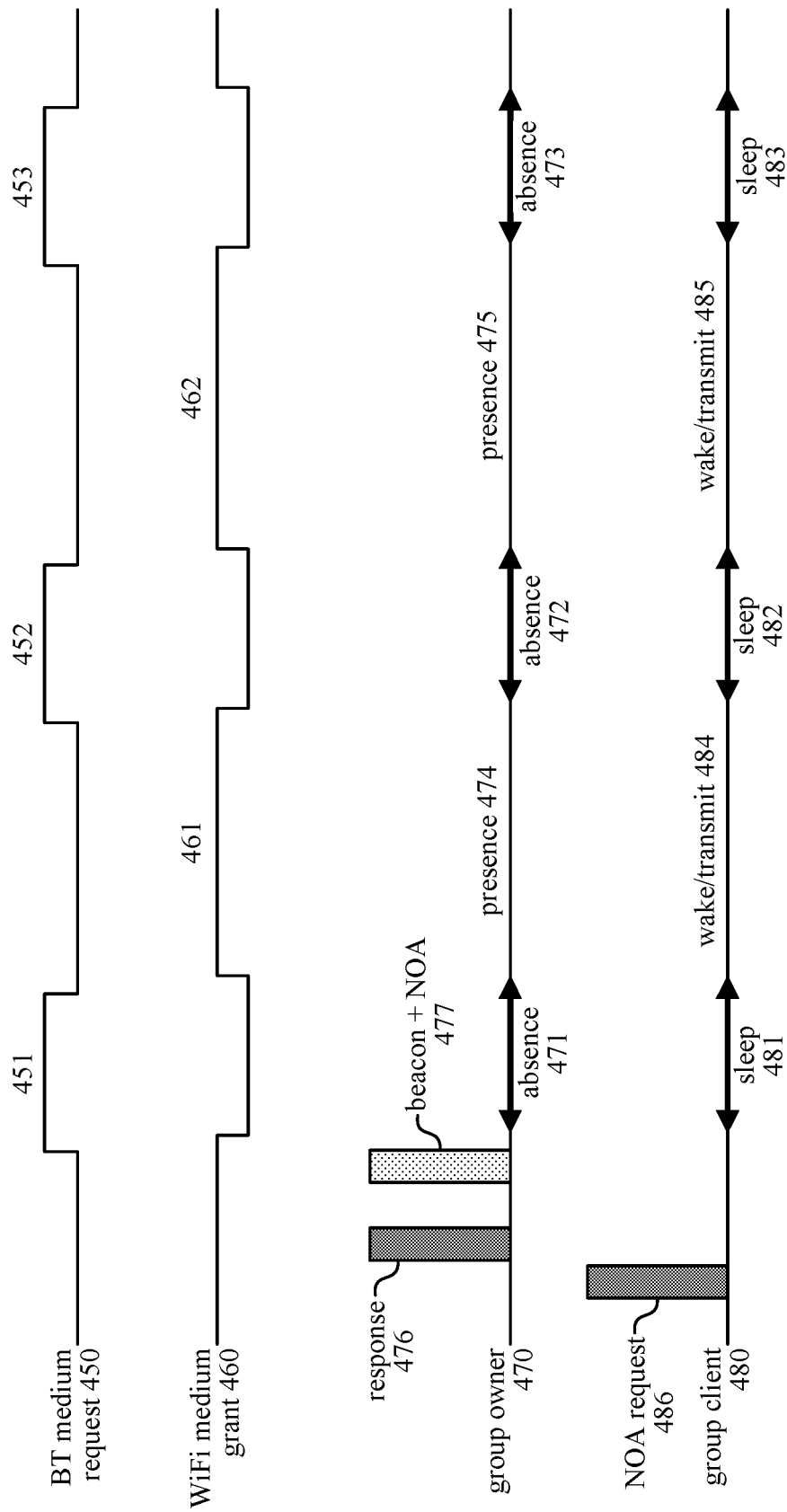

FIG. 4B illustrates a sequence of events during operation of the coexistence mechanism in which transmissions are timed according to an NOA schedule originating from a GC device. In FIG. 4B, time proceeds from left to right. In a WiFi P2P network 100, a GC device (e.g., GC device 102) can act as a traffic arbiter instead of the GO device (e.g., GO device 101).

In this situation, the GC device 102 requests an NOA schedule in a request action frame 486 transmitted to the GO device 101, as shown in the group client timeline 480. In one embodiment, the GC device 102 requests an NOA schedule that coincides with the start of periodic Bluetooth traffic (e.g., eSCO traffic). That is, the first absence period starts at the same time or prior to the expected transmission of the first Bluetooth eSCO messages. The period of the requested NOA schedule also corresponds with the period of the Bluetooth traffic that will be transmitted, and the absence periods in the NOA schedule are of sufficient duration to accommodate the expected duty cycle of the Bluetooth traffic. For example, each of the absence periods in an exemplary proposed NOA schedule includes at least 1250 microseconds per 7500 microseconds of medium time to accommodate Bluetooth eSCO traffic.

As illustrated in the group owner timeline 470, the GO device 101 acknowledges the NOA request 486 by transmitting a response 476 in response to receiving the request 486, then transmits a beacon frame 477 that includes the NOA schedule proposed by the GC device 102. The retransmitted NOA schedule is thus propagated to the GC devices 102-104 in the network 100. Accordingly, the GC devices 102-104 refrain from transmitting WiFi messages during the scheduled absence periods 471-473. Instead, these GC devices 102-104 can enter power saving modes, as shown in the group client timeline 480 (e.g., sleep periods 481-483 during the respective absence periods 471-473). Accordingly, the GC devices 102-104 operate in higher power consumption states (e.g., wake states during periods 484 and 485) during the presence periods 474 and 475, and can access the medium during these times.

Similar to the process shown in FIG. 4A, the Bluetooth medium request signal 450 is asserted in periods 451, 452, and 453 and, when the Bluetooth medium request signal 450 is asserted during one of the absence periods 471-473, the PTA 206 deasserts the WiFi medium grant 460, allowing the Bluetooth transceiver 203 to access the medium while preventing the WiFi transceiver 205 from accessing the medium.

Figure 5:
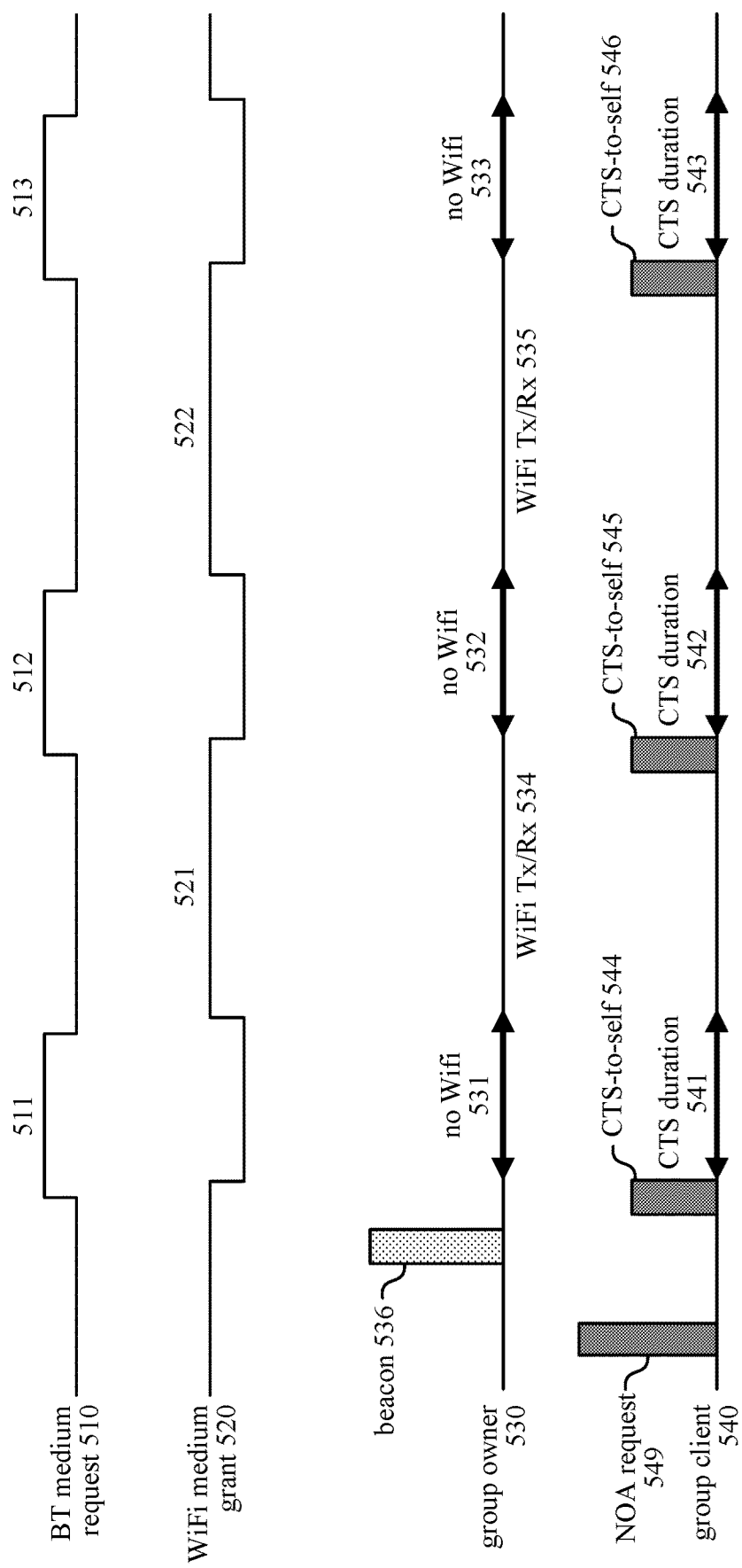
FIG. 5 illustrates a fallback mechanism for a coexistence process, according to an embodiment.

FIG. 5 illustrates operation of the coexistence mechanism, according to an embodiment, when the GO device 101 does not transmit a NOA schedule, either of its own accord or in response to an NOA request 549 including a proposed NOA schedule transmitted from a GC device 102. As illustrated in the group client timeline 540, the GC device 102 transmits the NOA request 549 with a proposed NOA schedule. If the GO device 101 rejects or ignores the NOA request 549, the GC device 102 reverts to the sending of CTS-to-self frames to protect its Bluetooth transmissions. In one embodiment, each CTS-to-self frame consumes 1250 microseconds of every 7500 microseconds of medium time; thus, the transmission of CTS-to-self frames is used as a fallback mechanism when the NOA schedule cannot be used.

As shown in the group owner timeline 530, after the NOA request 549 is transmitted, the GO device 101 transmits a beacon 536 that does not include any NOA schedule; thus, the NOA request 549 was not accepted. In response to detecting that the no NOA schedule is available (e.g., by receiving a beacon frame without an NOA schedule), the GC device 102 transmits a series of CTS-to-self frames 544-546, as shown in the group client timeline 540. Each CTS-to-self packet transmitted by the GC device 102 is a CTS packet that carries the GC device's own address, and announces to the other devices in the network 100 that the GC device 102 plans to transmit. Each of the CTS-to-self frames 544-546 reserves a portion of the medium time (i.e., the durations 541-543, respectively) as shown in the group client timeline 540. During the CTS durations 541-543, the devices 101-104 do not transmit or receive any WiFi messages; for example, the GO device 101 does not transmit or receive WiFi signals in the periods 531-533 corresponding to the periods 541-543 reserved by the CTS-to-self frames 544-546. Outside the periods 541-543, devices 101-104 in the network are able to transmit and receive WiFi messages (e.g., in periods 534 and 535).

Bluetooth medium request signal 510 is asserted during periods 511, 512, and 513, corresponding to the times when the medium is reserved for Bluetooth transmission by the CTS-to-self frames 544-546. The WiFi medium grant signal 520 is asserted during periods 521 and 522, corresponding to intervals when the medium is not reserved for Bluetooth transmission by one of the CTS-to-self frames 544-546.

Figure 6:
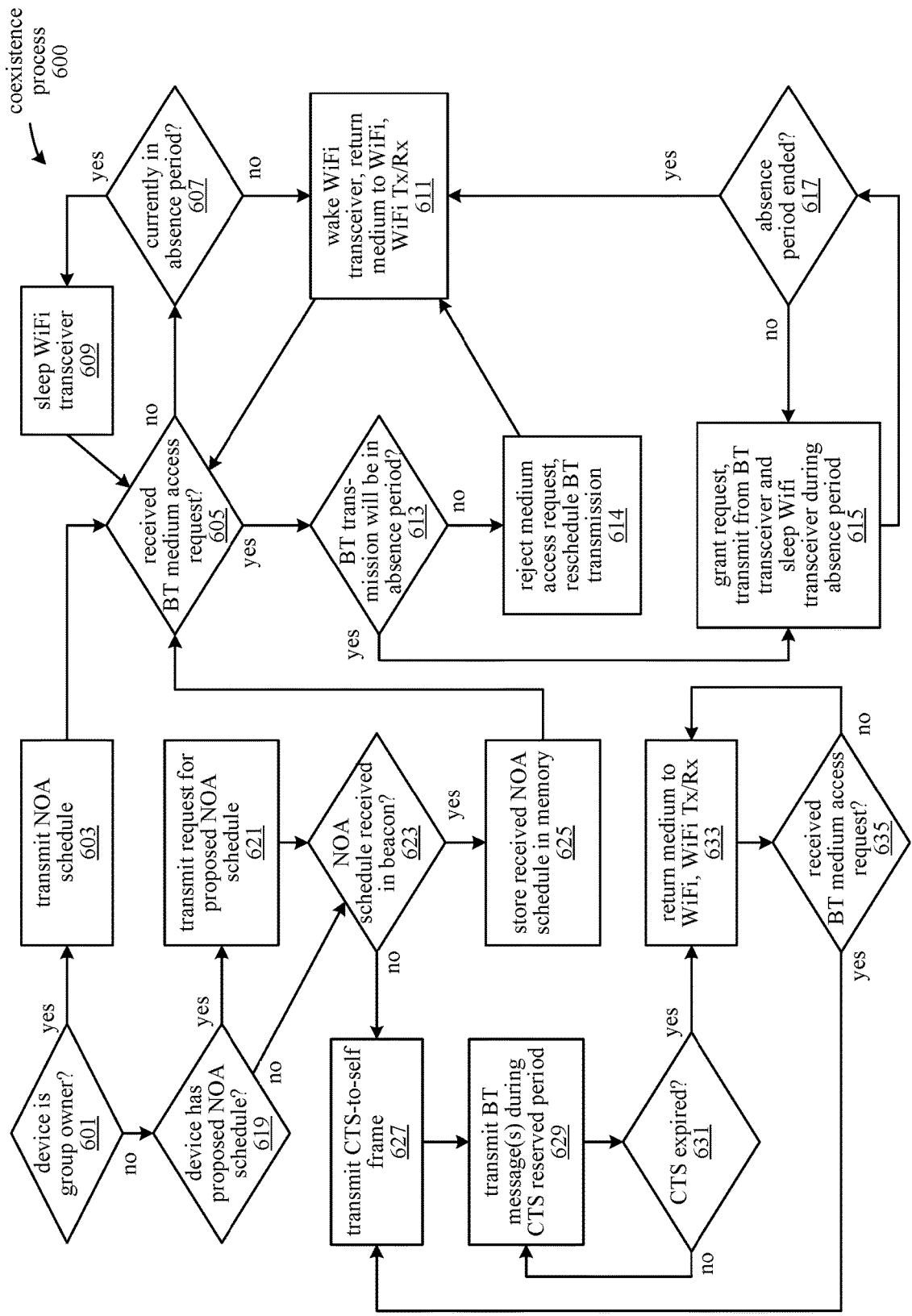
FIGS. 6 and 7 illustrate flow diagrams of coexistence processes, according to an embodiment.

FIG. 6 illustrates a flow diagram for a coexistence process 600 for allowing sharing of a medium between multiple radio transceivers in a wireless device, according to an embodiment. The process 600 can be performed in the wireless network 100 by various devices (e.g., GO device 101 and GC device 102) and their components (e.g., transceivers 203 and 205, PTA 206, etc.). In one embodiment, the process 600 is performed by a wireless device 201 functioning as a GO device 101 or a GC device 102 in the wireless network 100.

The process 600 begins at block 601. At block 601, if the wireless device 201 is a GO device, the process 600 continues at block 603. At block 603, the wireless device 201 obtains and transmits an absence schedule (e.g., an NOA schedule according to the WiFi P2P protocol). In various embodiments, the NOA schedule can be generated by processing logic in the wireless device 201 in accord with configuration parameters, received from another device, specified by a user, etc. The NOA schedule is received at the PTA 206 and stored in a memory accessible to the PTA 206. In one embodiment, the NOA schedule indicates multiple absence periods during which the wireless device 201, as the group owner device in the network 100, will be unavailable for receiving transmissions in a particular frequency band (e.g., the 2.4 GHz ISM band used to communicate over the network 100 using the WiFi protocol).

The NOA schedule indicates the multiple absence periods in terms of a start time for a first absence period following transmission of the NOA schedule, a duration for each of the multiple absence periods and for each presence time period between consecutive absence periods, and the number of absence periods defined in the NOA schedule. At block 603, the NOA schedule is transmitted by the primary WiFi radio transceiver of the wireless device 201 to the GC devices (e.g., 102-104) in the network 100.

At block 605, the PTA 206 determines whether a Bluetooth medium request has been received. The PTA 206 receives the request when it detects that the Bluetooth medium request signal 410 is asserted. If the request signal 410 is not asserted, then no medium request has been received from the Bluetooth transceiver 203. Accordingly, the process 600 continues at block 607.

At block 607, the PTA 206 determines whether the current time is in one of the absence periods. The PTA compares the current time as indicated by the device clock 304 with the start and end times of the absence periods as calculated from the stored NOA schedule 307. At block 607, if the current time is in an absence period, the process 600 continues at block 609.

At block 609, the PTA 206 causes the WiFi transceiver 205 to enter a low power consumption state (e.g., a sleep state). The PTA 206 causes the power management module 207 to reduce power consumption by the WiFi transceiver 205 by powering down portions of the WiFi transceiver 205, such as the radio, that will not be used during the absence period. From block 609, the process 600 returns to block 605. Thus, for the duration of the absence period, and while a Bluetooth medium access request has not been received, the blocks 605, 607, and 609 are repeated in a loop to maintain the WiFi transceiver 205 in a low power consumption state, in which it does not access the medium.

At block 607, if the current time is not within any of the scheduled absence periods, the process 600 continues at block 611. At block 611, the WiFi radio transceiver 205 operates in a higher power consumption state. The power management module 207 turns on components of the transceiver 205 to allow the transceiver 205 to transmit (Tx) and receive (Rx) WiFi communications over the network 100. At this time, medium access is also granted to the WiFi transceiver 205 by asserting of the WiFi medium grant signal 420. From block 611, the process 600 returns to block 605.

When the Bluetooth transceiver 203 has a message to transmit, the transceiver 203 requests access to the medium for transmitting the message by asserting the Bluetooth medium request signal 410. At block 605, if a medium access request has been received from the Bluetooth transceiver 230, the process 600 continues at block 613. The Bluetooth medium access request is received when asserted state of the Bluetooth medium request signal 410 is detected by the PTA 206.

At block 613, the PTA 206 determines whether the Bluetooth transmission will occur during one of the absence periods specified in the stored NOA schedule 307. In one embodiment, the PTA determines that the Bluetooth transmission will occur during an absence period if the Bluetooth medium request signal 410 is asserted during an absence period. If the Bluetooth message will not be transmitted during an absence period, the process 600 continues at block 614.

At block 614, the PTA 206 rejects the medium access request from the Bluetooth transceiver 203. In one embodiment, the PTA 206 rejects the request by maintaining the WiFi medium grant signal 420 in an asserted state, so that the WiFi transceiver 205 retains access to the medium instead of deasserting the signal 420 to grant medium access to the Bluetooth transceiver 203. The Bluetooth message awaiting transmission remains queued and its transmission is effectively rescheduled for a later time. The process 600 continues at block 611.

At block 611, since the current time is in a presence period (i.e., not in an absence period), the WiFi transceiver 205 is operated in the higher power consumption state and is granted or retains access to the medium. The WiFi transceiver 205 transmits and/or receives communications over the medium during this time.

At block 613, if the Bluetooth message will be transmitted during an absence period, then the process 600 continues at block 615. In one embodiment, the PTA 206 determines that the message will be transmitted during an absence period if the Bluetooth medium request signal 410 is in the asserted state during an absence period.

At block 615, the PTA 206 grants the Bluetooth medium access request by deasserting the WiFi medium grant signal 420. In response to the granting of the medium access request, the Bluetooth transceiver 203 transmits the message during the absence period. In one embodiment, the message can be a message that was previously queued prior to the start of the absence period; thus, transmission of the queued message is rescheduled to the next absence period. At this time, the WiFi transceiver 205 enters or is maintained in a low power consumption state. From block 615, the process 600 continues at block 617.

At block 617, The PTA 206 determines whether the absence period has ended. In one embodiment, the PTA compares the current time provided by the device clock 304 with start and end times for absence periods calculated from the values in the stored NOA schedule. Accordingly, the PTA 206 determines that the absence period has not ended when the current time is greater than the beginning time of the absence period, but is still less than the end time of the absence period. If the absence period has not ended, the process 600 returns to block 615. Blocks 615 and 617 are thus repeated in a loop, allowing the Bluetooth transceiver 203 to have medium access and the WiFi transceiver 205 to conserve power until the end of the absence period.

At block 617, the PTA 206 determines that the absence period has ended if the current time is greater than the end time of the absence period and less than the start time of the next absence period. If the absence period has ended, the process 600 continues from block 617 to block 611. At block 611, medium access is returned to the WiFi transceiver and the WiFi transceiver is operated in the higher power consumption state to transmit and/or receive messages.

Blocks 605-617 are repeated to grant medium access to the Bluetooth transceiver 203 while reducing power consumption in the WiFi transceiver 205 during absence periods, and to grant medium access to the WiFi transceiver 205 during presence periods. The operation of blocks 605-607 also prevents transmissions from the Bluetooth transceiver 203 and the WiFi transceiver 205 from interfering with each other. In one embodiment, the process 600 returns to block 603 from any point during the execution of blocks 605-607 when the NOA schedule expires or a periodic beacon frame is due for transmission.

At block 601, if the wireless device 201 is not a group owner device (e.g., the device 201 is a GC device 102), then the process 600 continues at block 619. At block 619, if the wireless device 201 has a proposed NOA schedule, the device 201 transmits an NOA request 486 including the proposed NOA schedule using its WiFi transceiver 205. From block 621, the process 600 continues at block 623. If at block 619 the wireless device 201 does not have a proposed NOA schedule, the process 600 continues at block 623 without transmitting the NOA request 486.

At block 623, if a beacon frame 477 transmitted by the GO device 101 includes an NOA and is received by the WiFi transceiver 205 of the wireless device 201, the process 600 continues at block 625. At block 625, the received NOA schedule 307 is stored in memory 303. From block 625, the process 600 continues at block 605. Blocks 605-617 are then repeated in a loop to allow the Bluetooth transceiver 203 to transmit and receive during the absence periods indicated in the NOA schedule, while the WiFi transceiver 205 is allowed to transmit and receive in the presence periods outside of the indicated absence periods.

At block 623, if a beacon frame is received from the GO device 101 that does not include an NOA schedule, then the process 600 continues at block 627. In blocks 627-633, the process 600 reverts to the transmission of CTS-to-self frames to reserve the medium for Bluetooth transmissions, since an NOA is not available. In some embodiments, the unavailability of the NOA can also occur when no NOA is received within a predetermined time of transmitting the proposed NOA schedule, or a previously transmitted NOA expires (i.e., all of the specified absence periods in the NOA elapsed). Thus, the process 600 may transmit the CTS-to-self frames in response to these conditions or other conditions indicating the unavailability of an NOA schedule as well.

At block 627, the wireless device 201 transmits a CTS-to-self frame from the WiFi transceiver 205. The CTS-to-self frame notifies the other devices in the wireless network 100 that the wireless device 201 will be transmitting on the medium for a predetermined duration. In response to receiving the CTS-to-self frame, other devices in the network 100 refrain from transmitting during the reserved time period. After sending the CTS-to-self frame, the wireless device 201 transmits one or Bluetooth messages from the Bluetooth transceiver during the time period reserved by the CTS-to-self frame, as provided at block 629. At block 631, if the time period reserved by the CTS-to-self frame has not expired, the process 600 returns to block 629. Accordingly, the blocks 629 and 631 are repeated so that Bluetooth transmissions can be transmitted over the medium for the duration of the reserved time period.

At block 631, when the time period reserved by the CTS-to-self frame expires, the process 600 continues at block 633. At block 633, the PTA 206 determines that the CTS-to-self reservation has expired and returns medium access to the WiFi transceiver 205 by asserting the WiFi medium grant signal 520. The WiFi transceiver 205 resumes transmitting and receiving of messages over the medium. From block 633, the process 600 continues at block 635. At block 635, if a Bluetooth medium access request has not been received (i.e., the Bluetooth medium request signal 510 is not asserted), then the process returns to block 633. Blocks 633 and 635 repeat in a loop while the Bluetooth transceiver has no messages to send, and the WiFi transceiver 205 continues to have access to the medium.

At block 635, if the Bluetooth transceiver 203 has asserted the Bluetooth medium request signal 510, the process 600 returns to block 627. Blocks 627-635 thus repeat in a loop, in which CTS-to-self frames are transmitted to reserve the medium for transmissions from the Bluetooth transceiver 203, and the WiFi transceiver 205 has access to the medium for transmitting and receiving messages outside of the reserved time periods. The CTS-to-self frames (e.g., frames 544-546) are transmitted for reserving each of a number of time periods (e.g., 541-543) in which the Bluetooth transceiver transmits messages.

Figure 7:
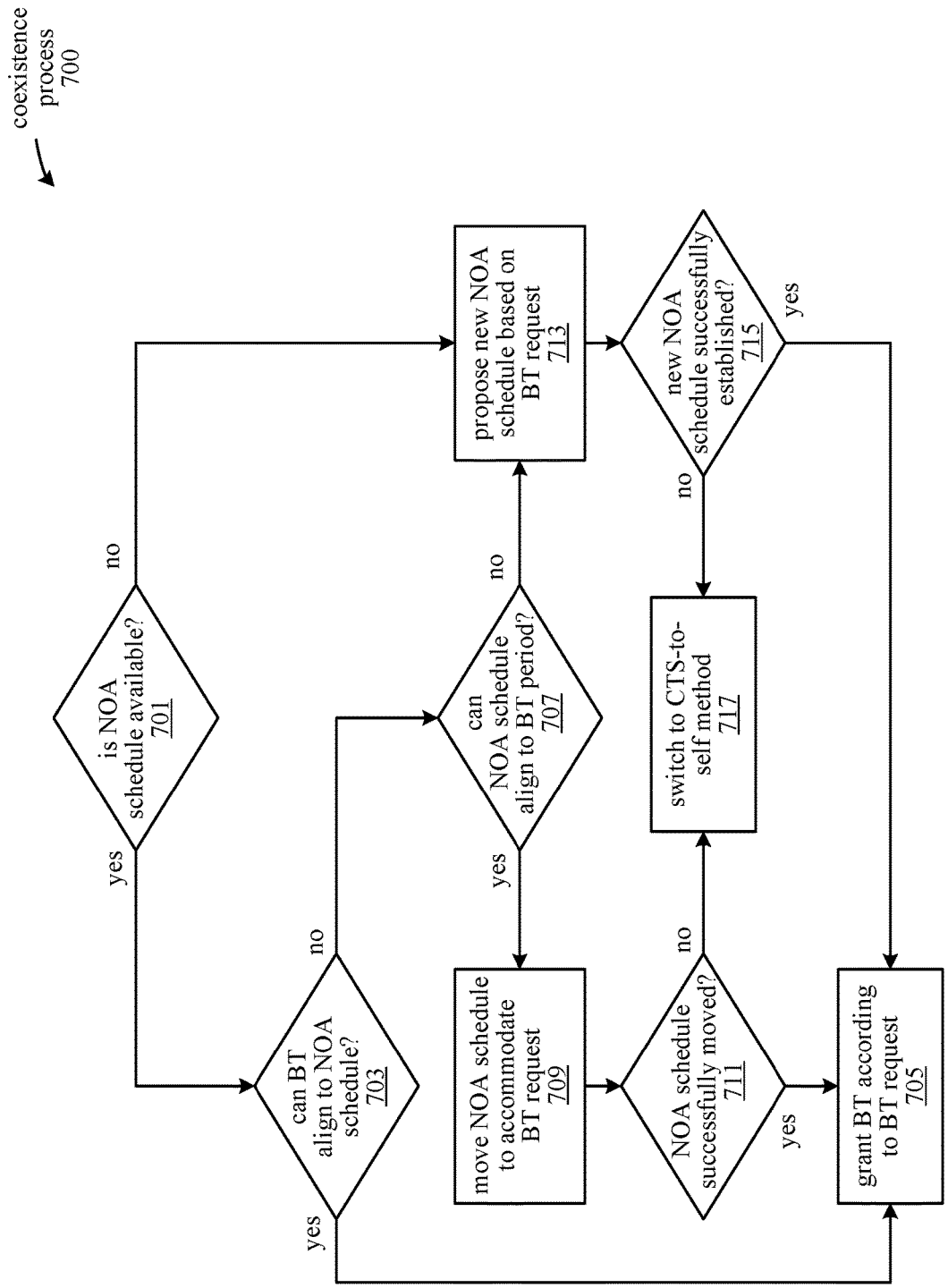

FIG. 7 illustrates a flow diagram of a process 700 for granting a Bluetooth medium access request, according to an embodiment. In one embodiment, process 700 operates on a wireless device 201 functioning as a GO device 101 or a GC device 102 in the wireless network 100, and operates concurrently with process 600. Process 700 includes additional operations for adjusting the Bluetooth transmission schedule to align with an established NOA schedule, or establishing a new NOA schedule to accommodate a Bluetooth transmission schedule.

At block 701, the device 201 determines if an NOA schedule is available. For example, if the device 201 is a GO device, the NOA schedule is available if the device 201 has generated an NOA schedule for transmission (e.g., as provided at block 603). If the device 201 is a GC device, the NOA schedule is available if an NOA schedule has been received from a GO device in the network 100. At block 701, if an NOA schedule is available, the process 700 continues at block 703.

At block 703, the device 201 determines whether requested Bluetooth communications can be aligned to the NOA schedule. The Bluetooth communications can be aligned to the NOA schedule if the transmitting and/or receiving times of the Bluetooth messages already coincide with the absence periods indicated in the NOA schedule, or can be adjusted to occur within the absence periods (e.g., by synchronizing or otherwise adjusting a clock in the Bluetooth transceiver). This can depend on the duration and timing of the Bluetooth communications, and the duration, duty cycle, and/or other characteristics of the indicated absence periods. At block 703, if requested Bluetooth communications can be aligned to the NOA schedule, the Bluetooth medium access request is granted, according to block 705. In one embodiment, the alignment of Bluetooth communications with the NOA schedule is accomplished by the rescheduling of the Bluetooth transmissions, as provided at block 614, and the granting of the Bluetooth medium access request is performed in accord with block 615 in process 600.

At block 703, if the Bluetooth communication periods are not able to be aligned to the absence periods indicated in the NOA schedule, the process 700 continues at block 707. At block 707, if the NOA schedule can instead be aligned to the Bluetooth communication periods, then the process 700 continues at block 709. At block 709, the NOA schedule is adjusted to accommodate the Bluetooth communication schedule.

At block 711, if the NOA schedule was successfully adjusted, the Bluetooth medium access request is granted, in accord with block 705. In one embodiment, the NOA schedule is successfully adjusted if the new NOA schedule is successfully transmitted to the other devices in the network 100 (when the device 201 is a GO device), or when a proposed NOA schedule from the device 201 (operating as a GC device) is accepted and retransmitted by the GO device to the other devices in the network 100.

At block 711, if the NOA schedule is not successfully adjusted to accommodate the Bluetooth communication schedule, the process 700 continues at block 717. At block 717, the device 201 switches to using the CTS-to-self mechanism (e.g., as provided at blocks 627-635).

At block 707, if the NOA schedule cannot be aligned to the Bluetooth communication schedule, the process 700 continues at block 713. At block 713, the device 201 proposes a new NOA schedule based on the Bluetooth request. In one embodiment, absence periods are calculated that include all of the requested Bluetooth communication periods. The NOA schedule is thus generated based on the predicted communication schedule of the Bluetooth radio transceiver. If the device 201 is a GO device in the network 100, the device 201 generates and transmits a new NOA schedule (e.g., in accord with block 603). If the device 201 is a GC device in the network 100, the device 201 generates a proposed NOA schedule and transmits a request for the proposed NOA schedule (e.g., at blocks 619 and 621).

At block 715, if the new NOA schedule is successfully established that accommodates the Bluetooth communication schedule, the process 700 continues at block 705. At block 705, the Bluetooth medium access request is granted. If the new NOA schedule cannot be successfully established, the process 700 continues at block 717. At block 717, the device 201 switches to using the CTS-to-self mechanism.

The coexistence processes 600 and 700 thus allow sharing of the medium between multiple radio transceivers by synchronizing transmission activity of one of the radio transceivers with absence periods indicated in an absence schedule (e.g., NOA) transmitted from a group owner (GO) of a wireless network, and using CTS-to-self or power management frames for medium sharing as a fallback mechanism when an absence schedule is not available. Since transmission of a NOA uses fewer frames overall compared to the transmission of CTS-to-self and power management frames, bandwidth of the medium is conserved.

In the foregoing embodiments, various modifications can be made; for example, signals described as being asserted with a high voltage may instead be asserted with a low voltage, or specified components can be replaced with other components having similar functionality. As described herein, conductive electrodes that are "electrically connected" or "electrically coupled" may be coupled such that a relatively low resistance conductive path exists between the conductive electrodes. Quantities, dimensions, or other values described as "substantially" equal may be nominally equal but need not be exactly equal (with variations due to manufacturing tolerances, environmental conditions, quantization or rounding error, and/or other factors), or may be sufficiently close to equal for achieving an intended effect or benefit.

Embodiments described herein include various operations. These operations may be performed by hardware components, software, firmware, or a combination thereof. As used herein, the term "coupled to" may mean coupled directly or indirectly through one or more intervening components. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Certain embodiments may be implemented as a computer program product that may include instructions stored on a computer-readable medium. These instructions may be used to program a general-purpose or special-purpose processor to perform the described operations. A computer-readable medium includes any mechanism for storing or transmitting information in a form (e.g., software, processing application) readable by a machine (e.g., a computer). The computer-readable storage medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory, or another type of medium suitable for storing electronic instructions.

Additionally, some embodiments may be practiced in distributed computing environments where the computer-readable medium is stored on and/or executed by more than one computer system. In addition, the information transferred between computer systems may either be pulled or pushed across the transmission medium connecting the computer systems.

Although the operations of the method(s) herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent and/or alternating manner.

In the foregoing specification, the claimed subject matter has been described with reference to specific exemplary embodiments thereof. It will, however, be evident that various modifications and changes may be made thereto without departing from the broader scope of the invention as set forth in the appended claims. The specification and drawings are, accordingly, to be regarded in an illustrative sense rather than a restrictive sense.

What is claimed is:

1. A method, comprising:
    receiving an absence schedule indicating a plurality of absence periods during which a group owner device in a wireless network will be unavailable for receiving transmissions in a frequency band;
    storing the absence schedule in a memory;
    controlling a primary radio transceiver of a wireless device based on the absence schedule;
    receiving a first request from a secondary radio transceiver of the wireless device to transmit a first wireless message in the frequency band;
    if the first request is prior to one of the plurality of absence periods, granting the first request based on the absence schedule once at least one of the plurality of absence periods occurs; and
    if an attempt to align communications from the secondary radio transceiver with the absence schedule fails, modifying the absence schedule.

2. The method of claim 1, further comprising, in response to the granting of the first request, transmitting the first wireless message from the secondary radio transceiver during the one of the plurality of absence periods.

3. The method of claim 1, further comprising:
    receiving a second request from the secondary radio transceiver to transmit a second wireless message in the frequency band; and
    rejecting the second request in response to determining based on the stored absence schedule that a requested transmission time of the second wireless message is not within any of the plurality of absence periods and is not prior to any of the plurality of absence periods.

4. The method of claim 3, further comprising, in response to determining that the requested transmission time is not within any of the plurality of absence periods and is not prior to any of the plurality of absence periods, rescheduling transmission of the second wireless message in one of the plurality of absence periods.

5. The method of claim 1, wherein the absence schedule indicates:
    a start time for a first absence period following transmission of the absence schedule;
    a duration for each absence period in the plurality of absence periods and for each time period between consecutive absence periods; and
    a number of absence periods in the plurality of absence periods.

6. The method of claim 1, further comprising:
    generating the absence schedule based on a predicted communication schedule of the secondary radio transceiver; and
    transmitting the absence schedule via the primary radio transceiver to one or more group client devices, wherein the group owner device comprises the primary radio transceiver.

7. The method of claim 1, wherein controlling the primary radio transceiver further comprises:
    causing the primary radio transceiver to enter a low power consumption state during each of the plurality of absence periods; and
    operating the primary radio transceiver in a high power consumption state during intervals outside any of the plurality of absence periods.

8. The method of claim 1, further comprising:
adjusting a clock of the secondary radio transceiver based on the absence schedule to align one or more communication times of the secondary radio transceiver with one of the plurality of absence periods, wherein the absence schedule is received at the primary radio transceiver via a transmission from the group owner device.

9. The method of claim 1, further comprising:
transmitting a proposed absence schedule; and
in response to receiving a beacon frame without any absence schedule,
transmitting from the primary radio transceiver a clear-to-send-to-self (CTS-to-self) frame for each of a plurality of transmission periods for the secondary radio transceiver; and
during each of the plurality of transmission periods, transmitting a wireless message from the secondary radio transceiver.

10. A device, comprising:
a first interface coupled with a primary radio transceiver and configured to receive an absence schedule indicating a plurality of absence periods during which a group owner device in a wireless network will be unavailable for receiving transmissions in a frequency band;
a memory configured to store the absence schedule;
a second interface coupled with a secondary radio transceiver and configured to receive a first request from the secondary radio transceiver to transmit a first wireless message in the frequency band; and
arbitration logic coupled with the second interface and configured to:
grant the first request based on the absence schedule once at least one of the plurality of absence periods occurs if the first request is prior to one of the plurality of absence periods,
control a primary radio transceiver of a wireless device based on the absence schedule, and
modify the absence schedule if an attempt to align communications from the secondary radio transceiver with the absence schedule fails.

11. The device of claim 10, wherein the primary radio transceiver and the secondary radio transceiver are located in the same integrated circuit device package as the arbitration logic.

12. The device of claim 10, wherein the arbitration logic is configured to control the primary radio transceiver by causing a second wireless transmission from the primary radio transceiver to be transmitted during an interval outside the plurality of absence periods indicated by the absence schedule.

13. The device of claim 10, further comprising:
the primary radio transceiver configured to transmit the absence schedule according to a first communication protocol; and
the secondary radio transceiver configured to transmit the first wireless message according to a second communication protocol.

14. The device of claim 13, further comprising a power management module coupled with the primary radio transceiver and configured to:
cause the primary radio transceiver to enter a low power consumption state during one or more of the plurality of absence periods; and
cause the primary radio transceiver to operate in a high power consumption state during intervals outside any of the plurality of absence periods.

15. A system, comprising:
a first wireless device in a wireless network, comprising:
a primary radio transceiver,
a secondary radio transceiver, and
a packet traffic arbiter configured to:
receive an absence schedule indicating a plurality of absence periods during which a group owner device in the wireless network will be unavailable for receiving transmissions in a frequency band;
store the absence schedule in a memory;
control the primary radio transceiver based on the absence schedule;
receive a first request from the secondary radio transceiver to transmit a first wireless message in the frequency band;
grant the first request based on the absence schedule once at least one of the plurality of absence periods occurs if the first request is prior to one of the plurality of absence periods; and
modify the absence schedule if an attempt to align communications from the secondary radio transceiver with the absence schedule fails, and
a set of additional wireless client devices in the wireless network configured to communicate wirelessly with the first wireless device.

16. The system of claim 15, wherein:
the secondary radio transceiver is configured to transmit the first wireless message in response to granting of the first request; and
the packet traffic arbiter is further configured to control the primary radio transceiver by causing a second wireless transmission from the primary radio transceiver to be transmitted during an interval outside the plurality of absence periods indicated by the absence schedule.

17. The system of claim 15, further comprising a set of one or more Bluetooth devices, wherein the first wireless device is configured to transmit the first wireless message to one of the set of Bluetooth devices, wherein the primary radio transceiver is configured to communicate according to a WiFi protocol.

18. The system of claim 15, wherein each wireless client device in the set of additional wireless client devices is configured to enter a low power consumption state during each of the plurality of absence periods.

19. The system of claim 15, further comprising:
a group owner device configured to transmit the absence schedule to the first wireless device,
wherein for each wireless client device in the set of additional wireless client devices, the wireless client device is coupled with the group owner device via a wireless network link and is configured to access a wide area network via the group owner device.

20. The system of claim 15, wherein:
the first wireless device is a group owner device of the wireless network; and
the first wireless device is configured to transmit the absence schedule via the primary radio transceiver in response to receiving a proposed absence schedule from a wireless client device in the set of additional wireless client devices.

* * * * *